Sept. 19, 1961     O. R. NEMETH     3,001,092
STEPPER MOTOR

Filed Sept. 25, 1957     3 Sheets-Sheet 1

INVENTOR.
OTTO R. NEMETH
BY Elliott & Pastoriza
ATTORNEYS

Sept. 19, 1961         O. R. NEMETH                3,001,092
                       STEPPER MOTOR
Filed Sept. 25, 1957                          3 Sheets-Sheet 2

INVENTOR.
OTTO R. NEMETH
BY *Elliott & Pastoriza*
ATTORNEYS

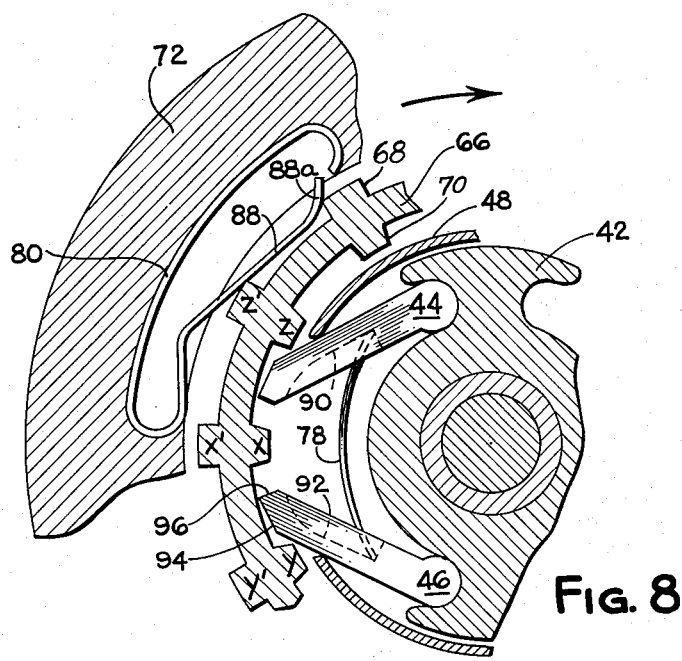
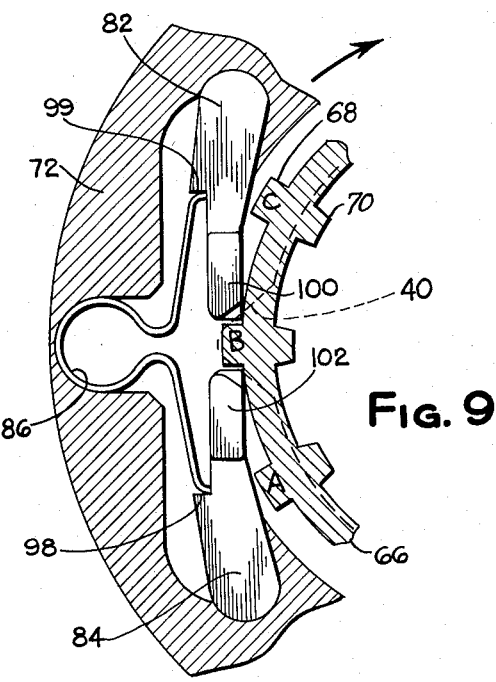

United States Patent Office 3,001,092
Patented Sept. 19, 1961

3,001,092
STEPPER MOTOR
Otto R. Nemeth, 2225 S. Carmelina Ave.,
Los Angles, Calif.
Filed Sept. 25, 1957, Ser. No. 686,101
12 Claims. (Cl. 310—37)

This invention generally relates to a stepper or digital motor and more particularly to an automatic bi-directional incremental stepper motor designed for diverse applications and most advantageously employed in connection with automation equipment, various camera functions, digital computer apparatus, and other operations where unusually high accuracy, high pulse rate, and positively controlled operation is required.

It is, therefore, an object of the present invention to provide an automatic bi-directional incremental stepper motor which is highly accurate and positive in its movement regardless of its actuation in either of two opposite directions.

Another object of the present invention is to provide an automatic bi-directional stepper motor with a maximum pulse rate and relatively low power dissipation.

Another object of the present invention is to provide an automatic bi-directional incremental stepper motor which is uniquely constructed for long maintenance-free life despite unusual environmental conditions.

Another object of the present invention is to provide an automatic bi-directional incremental stepper motor which requires a relatively small operating torque, and which has an overall balanced construction, so as to operate in a positive manner regardless of unusual acceleration loads to which it may be subjected.

A still further object of the present invention is to provide a stepper motor having its highest toque upon initial application of current.

These and other objects and advantages of the present invention are generally achieved by providing an automatic incremental stepper motor according to the present invention which comprises an armature balanced for rotation about a given axis and electromagnetic means in the motor adapted and designed to effect movement of the armature from one position to another position. In addition, force means are coupled to the armature which act to bias and return the armature towards the initial or said one position after actuation thereof.

As an important feature of the present invention, driving means are coupled for movement with the armature. The driving means are positioned so as to actuate driven means mounted for rotation about the given axis of the motor. The driven means are positioned for engagement by the driving means during movement of the armature from said one or initial position to said another position or the operated position.

In a preferred construction, the automatic incremental stepper motor is bi-directional in movement so that the armature may either be angularly actuated from a first normal position to either a second operated position or a third operated position, the third position being in an opposite direction from the second position with respect to the first position. Also, locking means are preferably coupled to the motor so as to prevent driving engagement between the driving and driven means until such time as the armature has rotated through a given angular distance. In this regard, releasing means are further employed which effect unlocking of the locking means immediately following movement of the armature through said given angular distance, whereby incremental movement may take place.

A better understanding of the present invention may be had by reference to the drawings showing an illustrative embodiment only, and in which:

FIGURE 8 is an enlarged sectional view illustrating the pawl driving means employed; and, FIGURE 9 is an enlarged sectional view illustrating locking pawl means employed.

Figure 1:
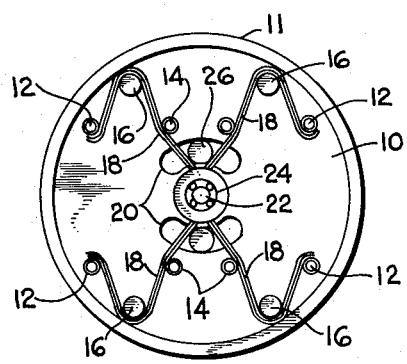
FIGURE 1 is a top plan view of the stepper motor according to the present invention, more specifically illustrating the force means employed to return the armature to its normal or first position.

Referring now to the drawings, there is shown in FIGURE 1 a disc-like insulating member 10 adapted to be mounted within one end of a cylindrical casing 11. No effort has been made to illustrate the overall appearance of the stepper motor, which merely has a cylindrical configuration.

The insulating member 10 has projecting therefrom near its periphery a set of four angularly spaced pins 12 and, at a lesser radial distance from the periphery, a set of four angularly spaced pins 14. In addition, the insulating member 10 has projecting upwardly therefrom a set of four posts 16. The outer pins 12, inner pins 14, and posts 16 co-operatively retain leaf springs 18 of which four are provided. It is to be further noted that insulating member 10 is provided with arcuate openings 20 and with a central aperture 22 within which is mounted a bearing 24 for a purpose to become clearer as the specification proceeds.

As will be seen from the view of FIGURE 1 studs 26 project upwardly through the respective openings 20 and between opposing sets of leaf springs 18. Thus, the studs 26 are normally biased towards the position as shown in FIGURE 1.

Figures 2, 3:
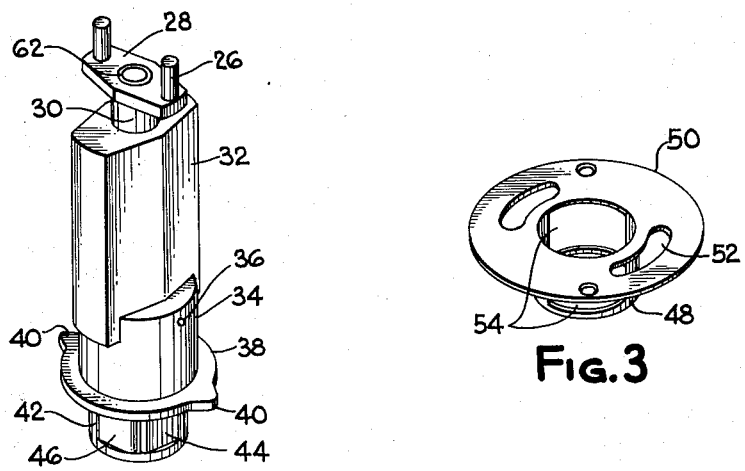
FIGURE 2 is a perspective view of the armature of the stepper motor and certain coupled elements.
FIGURE 3 is a perspective view of a sleeve retainer designed to be mounted on the bottom portion of the armature unit shown in FIGURE 2.

The studs 26 are more clearly shown in the view of FIGURE 2 as extending upwardly from an arm 28, the latter being integrally formed with a hollow extension 30 rigidly secured to an armature 32.

The armature 32 is coupled to an armature carrier 34 and secured thereto through a key pin 36. The armature carrier 34 is provided at its lower end with an increased diameter cam member 38, which includes cam projections 40.

Figure 6:
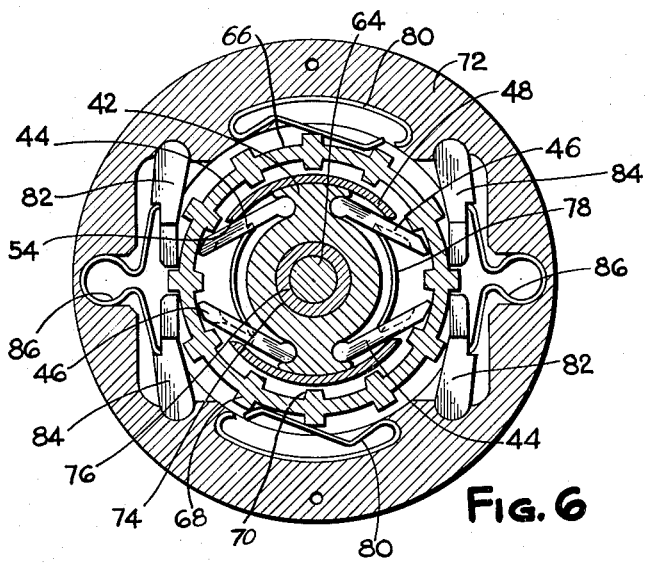
FIGURE 6 is a sectional view of the interrelated driving and driven means of the stepper motor.

The armature carrier 34 additionally includes a lower, decreased diameter inner pawl retainer 42, more clearly shown in the view of FIGURE 6, which has mounted therein pawls 44 and 46. Only one set of pawls 44 and 46 is shown in the view of FIGURE 2, but as seen from the view of FIGURE 6, another opposing set is also provided.

A sleeve retainer 48 fits over the inner pawl retainer 42, the sleeve retainer being shown in the view of FIGURE 3. The retainer 48 is provided with an increased diameter flange 50 provided with a pair of diametrically opposed arcuate openings 52, FIGS. 3 and 7. The sleeve portion itself is provided with a pair of opposing windows 54. The function of this retainer and the openings 52 and windows 54 will be more clearly understood when the operation of the device is subsequently explained.

Figure 4:
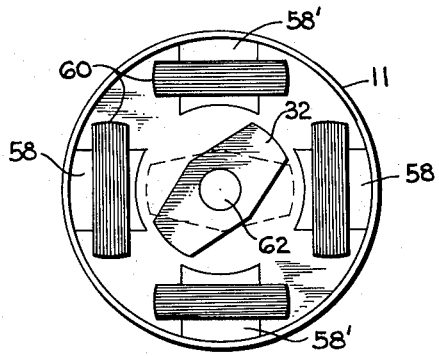
FIGURE 4 is a sectional view of the armature and co-operating electromagnetic means designed to actuate same.

In FIGURE 4, a sectional view of the device has been shown to illustrate the movement of the armature 32 in response to actuation of a pulse power supply (not shown) connected to poles 58 and 58' arranged in quadrature about the armature, each of the poles being provided with a winding 60. Thus, in the solid line representation of FIGURE 4, the armature 32 is disposed in its neutral or normal unactuated position about 45° with respect to the aligned position of a pair of coacting poles. Upon connection of the power supply to the windings of poles 58, for example, the armature is subjected to a power pulse so as to be actuated to the dotted line position as shown. Of course, a similar and opposite angular movement of the armature will occur from the neutral position if the coils surrounding the other pair of poles 58' are actuated.

As a consequence of this design, the peak torque occurs upon the initial application of current to the poles 58 or 58', whereby relatively high speed operation may be attained even with appreciable inertial loads.

Figure 5:
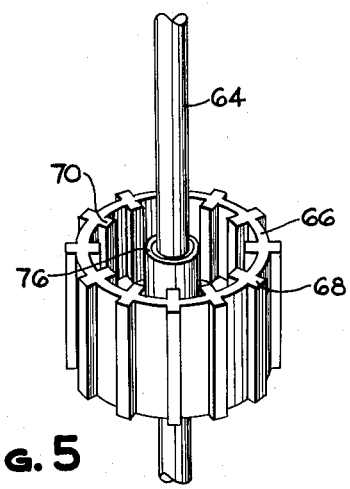
FIGURE 5 is a perspective view of the driven means or star wheel and the shaft coupled thereto.

It is to be noted that a bore 62 extends axially through the armature, as shown in FIGURES 2 and 4. The bore 62 is dimensioned to receive an output shaft 64 rigidly coupled to a star wheel 66, the latter two elements being shown in the view of FIGURE 5. The star wheel 66 has two sets of circumferentially spaced teeth, the radially outwardly projecting teeth being generally identified by the numeral 68 and the radially inwardly projecting teeth being generally identified by the numeral 70.

The star wheel 66 is adapted to fit within a cavity in an insulating housing 72 formed of plastic or the like, as more clearly shown in the view of FIGURE 6. The armature assembly 32 in turn has its lower end or inner pawl retainer 42 (shown in FIGURE 2) dimensioned so as to extend within the star wheel 66 in a manner as shown in FIGURE 6. The inner pawl retainer 42 is further provided with a bore 74 to receive an upwardly extending bearing post 76 formed integrally with the star wheel 66. The star wheel 66 is closed off at its bottom end.

As will be noted from the view of FIGURE 6, the oppositely positioned inner pawls 44 and 46 are pivotably retained in the pawl retainer 42 opposite the sleeve retainer windows 54 and biased outward by springs 78, respectively, extending between each pair of pawls 44 and 46. The pawls 44 and 46 are restrained from snapping outwardly by the side walls of the sleeve 48 surrounding the retainer 42.

The housing 72 retains a pair of diametrically opposed springs 80, each of which is formed to exert a retaining force against the outer set of star wheel teeth 68. The housing also retains two pairs of oppositely positioned outer pawls 82 and 84, which are pivotably biased radially inwardly by outer pawl springs 86, so as to engage and lock one of the outer teeth 68.

Figure 7:
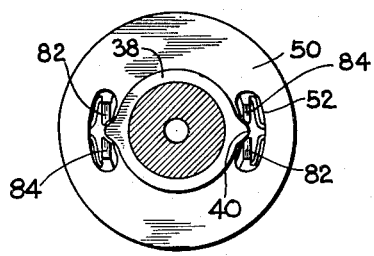
FIGURE 7 is a plan view of the cam releasing and pawl locking means.

As shown in the view of FIGURE 7, the flange portion 50 of the sleeve retainer 48 is adapted to be juxtaposed on the upper surface of the housing 72. The cam projections 40 of the cam member 38 in turn extend between and in close relation to the pawls 82 and 84 which partially project above the upper surface of the housing 72.

The respective functioning of the various components of the improved stepper motor of the present invention as well as the detailed operation thereof may now be explained.

As heretofore described, the studs 26 projecting between springs 18 normally bias the armature towards the solid line or neutral position as shown in FIGURE 4. Upon pulse energization of the poles 58 for example, and actuation of the armature 32 to the dotted line position of FIGURE 4, the cam member 38 will move through an arc corresponding to the arcuate movement of the armature 32, assumed here to be clockwise. As this movement occurs, the cam projections 40 will force the outer pawl 82 of each pair radially outward in a pivoting action against the biasing force of the springs 86, as shown more clearly in the views of FIGURES 6 and 7. The pawls 84 would of course be similarly cammed outward by counter clockwise movement of the armature. It will be appreciated that before either cam projection 40 is effective to force the pawls 82 (or 84) outwardly a sufficient distance to unlock the star wheel, the cam member 38 and armature 32 must move through a small angular distance, approximately three to six degrees. After this movement has occurred, the pawl 82 will be sufficiently clear of the outer teeth 68 of the star wheel to permit the inner pawl 46 (assuming movement in a clockwise direction) to drive the inner teeth 70 of the star wheel.

This action may be more clearly understood by reference to FIGURE 8. Thus, as shown in FIGURE 8, the inner pawls 44 and 46 include, respectively, groove portions 90 and 92 which function to retain the inner pawl spring 78. The free end of the pawl 46, for example, has angular shape to provide a trailing edge 94 and a leading edge 96. As the pawl retainer 42 is moved in a clockwise direction following movement of the armature 32, the leading edge 96 of the pawl 46 will finally be brought into engagement with the inner tooth X. It will be noted that the leading edge 96, when the stepper motor is disposed in the normally unactuated position of FIGURE 8, is spaced a small distance from the tooth X. This angular distance permits the pawl retainer 42 to rotate approximately three to six degrees as mentioned above, until the cam projections 40 unlock the star wheel as will be described more fully in conjunction with FIGURE 9.

As the pawl 46 drives the tooth X clockwise through an arc of approximately thirty degrees, the companion pawl 44 will be cammed radially inwardly as it moves under the side walls of the sleeve retainer 48. Thus, at the end of the work stroke the tooth X will be disposed in the former position of the tooth Z and the tooth Y in the former position of the tooth X.

As soon as the pole coils 60 have been de-energized, the armature 32 will again be forced to assume the solid line or neutral position of FIGURE 4 by the biasing action of the springs 18 on the studs 26. As a consequence, the pawl retainer 42 will rotate back to the position of FIGURE 8, with the companion pawls 44 and 46 now assuming positions at opposite sides of tooth Y instead of tooth X. That is, during the return or counterclockwise movement of the pawl retainer 42, the pawl 44 is spring biased outwardly through the sleeve retainer 48 so as to ride in the space between teeth X and Y, and the pawl 46 rides over the tooth Y to assume a driving position behind the tooth, similar to that shown in FIG. 8.

As the star wheel 66 during the above described driving operation moves in a clockwise direction, the outer tooth Z' will force the angulated portion 88 of spring 80 radially outwardly to store energy in the spring 80 of increasing amount until its curved end 88a rides over the tooth Z' in a snap-like action. This function of the spring 80 is important since the torque imposed on the armature 32, as shown in FIGURE 4, becomes increasingly less as the armature approaches its dotted line or fully actuated position. Thus, the spring 80 and more specifically the portion 88 thereof functions to supplement the decreasing electromagnetic torque by storing energy which is finally released in a positive camming operation on the associated tooth near the end of the movement of the armature 32.

It is also evident that the curved end portion 88a of the spring portion 88 will act as a retaining member preventing backward movement of the tooth Z' once it has been driven clockwise through an arc of thirty degrees by the pawl 46. The importance of this function of the spring 80 will be more clearly understood after a description of FIGURE 9.

Referring now to FIGURE 9, it will be seen that the pawls 82 and 84 similarly include detent portions 98 and 99 to retain the biasing spring 86 for pivoting the pawls 82 and 84 radially inwardly against the outer teeth of the star wheel 66. The pawls 82 and 84 include upwardly extending portions 100 and 102 protruding through slots 52 in flange 50, between which is disposed a cam projection 40 as indicated by the dotted lines and as shown in FIG. 7. Upon clockwise movement of the armature 32 and corresponding movement of the inner pawl retainer 42, the cam portion 40 immediately engages the projecting portion 100 of the pawl 82 to force it radially outward within a limited angular movement of three to six degrees. Accordingly the pawl 82 is disengaged prior to driving action of the pawl 46. Thus, the locking action of the pawl 82 preventing rotation of the star wheel 66 will be released to enable the inner pawl 46 to drive the tooth X as above described. In consequence, the outer tooth B will move to the former position of the tooth C, and the tooth A will move to the former position of the tooth B.

It will be noted, however, that upon return of the armature to its normal solid line position of FIGURE 4, the cam projection 40 will also be actuated in a reverse direction so as to again force the portion 100 of the pawl 82 in a radially outward direction. Thus, as the pawl retainer 42 and the armature 32 move back to the initial position, the star wheel 66 will not be locked by the pawl 82 until the cam member projection 40 has returned to the position as shown in FIGURE 9. However, the portion 88 of spring 80 and more particularly the end 88a thereof will tend to prevent any springing back of the star wheel 66 which might occur. Of course, once the cam projection 40 has returned to its original position between the pawl projections 100 and 102 the pawls 82 and 84 will now positively lock tooth A of the star wheel to prevent rotation thereof.

Thus the star wheel which in turn drives the output shaft 64 is operable incrementally to advance the shaft by increments or steps, as long as a given pair of poles such as 58, continues to apply energy pulses. Obviously the shaft is stepped in the opposite direction when the other poles 58' apply the pulses, the reverse operation being apparent from the above description.

In cases where excessive external elastic loads are coupled to the stepper motor, it may be further advisable to provide the portions 100 and 102 of the pawls 82 and 84, respectively, with inclined surfaces and to make the cam projection 40 flexible in an axial direction. With such a construction, the cam projection 40 would positively unlock the pawl portion 100 upon actuated movement of the armature 32; on the other hand, upon the return spring movement, the cam projection 40 would rise and slide along the inclined surface 100 without forcing the pawl 82 pivotably radially outward. However, under most load conditions such a modification is not required.

With the construction as heretofore described, the stepper motor may be constructed to have a nominal rating of approximately 25 pulses per second and units have been built as described to have a life in excess of several hundred million operations in each direction. It is also to be noted that angular accuracy has been obtained within plus or minus one degree with no accumulated tolerance build-up, and that no spring loaded detent is employed which might contribute to power loss.

It will be apparent that many modifications and changes may be made in the illustrative embodiment shown and described without departing from the scope and spirit of the invention. It is also to be pointed out that various conventional structural details have not been shown or described, for example, relating to the assembly of the various components by screws, the wires leading from the coils, and power supply utilized. The essence of the invention is primarily directed to the mechanical configuration employed in conjunction with the electromagnetic assembly used.

What is claimed is:

1. In an automatic bi-directional incremental stepper motor having an armature balanced for rotation about a given axis; electromagnetic means in said motor adapted to effect movement of said armature, respectively, from a first position to a second position in one direction or to a third position in an opposite direction; and force means coupled to said armature acting to bias and return said armature to said first position from said second position or said third position, respectively, a first pawl means coupled for movement with said armature; a star wheel mounted for rotation in said motor, said star wheel having a first set of circumferentially spaced teeth positioned for driving engagement by said first pawl means during movement of said armature from said first position to said second position or said third position, respectively; second pawl means mounted in said motor and normally disposed in a locking position with said star wheel preventing said driving engagement until said armature has rotated an initial angular distance; and, releasing means effecting unlocking of said second pawl means during movement of said armature through said angular distance whereby said motor is adapted for precise, high speed stepping operation.

2. Apparatus according to claim 1, in which said star wheel is provided with a second set of circumferentially spaced teeth, and in which said releasing means comprises a cam coupled for movement with said armature, said cam being shaped and positioned so as to lift said second pawl means from normal locking engagement with said second set of circumferentially spaced teeth in accordance with movement of said armature through said given angular distance.

3. Apparatus according to claim 1, and spring means mounted in said motor and frictionally engaging said star wheel, said spring means tending to hold in position said star wheel upon return of said armature to said first position.

4. Apparatus according to claim 3, in which said spring means is tensioned as said armature rotates from said first position towards said second and third position, respectively, or in which the stored energy of said spring means is released to effect a snap-like movement to said star wheel to supplement the force of the electro-magnetic means as said armature approaches said second position or said third position, respectively.

5. Apparatus according to claim 1, in which said armature and electromagnetic means are co-operatively positioned such that said electromagnetic means imposes its maximum torque on said armature initially upon actuation of said armature from said first position to said second or third position, respectively, said torque gradually decreasing as said armature approaches said second position or said third position, respectively, and energy storing means charged by said armature during initial movement thereof for supplementing the electro magnetic force during the final movement of the armature to either said second or third position.

6. An automatic bi-directional incremental stepper motor comprising an armature balanced for rotation about an axis, electro-magnetic means in said motor adapted selectively to effect movement of said armature, respectively, from a neutral position to a first position in one direction or to a second position in the opposite direction thereby to define a work stroke in either direction, and force means coupled to said armature acting to bias and return said armature to said neutral position from either said first or second positions respectively, characterized by a pair of uni-directional driving means, each coupled for movement with said armature and operable in an opposite direction from the other, driven means including an output shaft mounted for rotation in said motor, said shaft being related to said uni-directional driving means so that said shaft may be advanced in either direction a given angular distance in accordance with movement of said armature from said neutral position to either said first or second positions respectively, relatively fixed means operatively related to said armature adapted to lock said shaft during the period between completion of the work stroke of the armature and its return to the neutral position for a subsequent work stroke, and means for releasing said locking means in accordance with an initial angular movement of said armature from said neutral position in the subsequent work stroke whereby said motor is adapted for precise, high speed stepping operation.

7. An automatic bi-directional incremental stepper motor according to claim 6 in which the electro-magnetic means comprises two pairs of poles arranged in quadrature around said armature and the force means biases the armature to a neutral de-energized position approximately midway of the aligned positions of co-acting pairs of poles, and in which a pair of locking means for the driven means is operable in accordance with the angular position of the armature for blocking movement of said driven means as the armature is returned to neutral position and for releasing said driven means in accordance with initial armature movement thereby ensuring uniform and precise stepping of said driven means in either direction.

8. An automatic bi-directional incremental stepper motor according to claim 6, in which the driving means comprises a pair of pawls, and in which said driven means comprises a star wheel on the output shaft including angularly spaced teeth arranged so that one of said pawls is selectively adapted, depending on the direction of rotation of said driving means to engage successively said teeth following release of a respective tooth by the locking means, upon each movement of said armature from said neutral position to either of said angular positions.

9. An automatic bi-directional incremental stepper motor according to claim 6, in which the driving means normally moves through a predetermined small angular distance prior to its engagement with the driven means, locking means coacting with the armature for locking the driven means in position such that driving engagement is precluded until the armature has rotated said angular distance, and means for releasing said locking means responsive to movement of said armature through said angular distance.

10. An automatic bi-directional incremental stepper motor according to claim 6 in which the locking means for the output shaft is a pair of oppositely disposed pawls coacting with angularly spaced teeth movable with the output shaft for selective locking in either direction, and the releasing means is a cam movable with the armature and positioned in the neutral position thereof so as immediately to engage one pawl or the other according to the direction of angular movement of the armature from the neutral position thereby to move the respective pawl to a non-locking position within limited initial movement of the armature, said cam upon continued movement of the armature releasing the respective pawl so that it can return to block the following tooth and thereby define the angular work stroke of the armature, the armature during its return movement to neutral momentarily releasing the respective pawl, and the output shaft is held in position during such momentary unlocking by resilient friction means.

11. An automatic bi-directional incremental stepper motor according to claim 10 in which the respective pawl is provided with an inclined cam surface and the cam is flexible in the shaft-axis direction so as to be deflected by said cam surface and thereby precluded from momentarily unlocking the respective pawl during armature return to neutral.

12. An automatic incremental stepper motor comprising electro-magnetic means adapted for pulse energization, a coacting armature movable angularly and responsive to a pulse energization of the electro-magnetic means to rotate from a neutral position through a predetermined angle defining the work stroke, and means for biasing and returning said armature toward its neutral position, characterized by driving pawls mounted for rotation with said armature, a toothed wheel coupled to an output shaft mounted for complete rotation about said axis and related to said driving pawls so that said shaft may be advanced by steps a given angular distance in accordance with successive movements of said armature from said neutral position through the work stroke, said driving pawls having a limited lost-motion relation to the toothed wheel at the beginning of the work stroke, additional relatively fixed pawl adapted to block and to lock said toothed wheel in position at the end of the work stroke, and releasing means coupled to said armature for unlocking said locking pawls in accordance with the lost-motion movement of the armature at the beginning of its subsequent work stroke whereby said motor is adapted for precise, high speed stepping operation.

References Cited in the file of this patent
UNITED STATES PATENTS

| | | |
|---|---|---|
| 1,022,742 | Kellum | Apr. 9, 1912 |
| 1,080,486 | Sheagren | Dec. 2, 1913 |
| 1,084,634 | Heuser | Jan. 20, 1914 |
| 1,832,474 | Bludworth et al. | Nov. 17, 1931 |
| 2,271,968 | Creager | Feb. 3, 1942 |
| 2,820,370 | Dolesh | Jan. 21, 1958 |